Dec. 5, 1961  A. J. ROUBAL  3,011,324
FLEXIBLE COUPLING
Filed Dec. 12, 1960

Inventor
Alexander J. Roubal
By Arthur M. Streich
Attorney

United States Patent Office 3,011,324
Patented Dec. 5, 1961

3,011,324
FLEXIBLE COUPLING
Alexander J. Roubal, Milwaukee, Wis., assignor to Allis-Chalmers Manufacturing Company, Milwaukee, Wis.
Filed Dec. 12, 1960, Ser. No. 75,153
10 Claims. (Cl. 64—12)

This invention relates to improvements in flexible couplings for transmitting power from a rotating driving shaft to a rotatable driven shaft which permit effective driving of the driven shaft even though the shafts are not in perfect alignment.

An object of the invention is to provide a new and improved shaft coupling which is simple in construction and which will permit effective transfer of torque from one shaft to another even though the shafts may be angularly or parallelly misaligned.

Another object of the present invention is to provide a new and improved flexible shaft coupling in which an inexpensive easily replaced cable connects the coupling driving member to the coupling driven member.

And still another object of the present invention is to provide a new and improved flexible shaft coupling of the type utilizing a cable for connecting driving and driven members in which only one cable need be used and the coupling is provided with an arrangement that keeps the cable taut even when the driven member may tend to lead or rock relative to the driving member. A driven member may lead a driving member when the driven member is connected to a load having a high inertia that causes to stop more slowly. The driven member may rock relative to the driving member when, for example, the driven member is connected to, for example, a grinding mill containing a tumbling load, which causes the driven member to rock relative to the driving member just before the mill stops turning.

Couplings similar to that which will be disclosed have heretofore been used but have proven to require more frequent adjustment and replacement of the cables than is desirable. The relative rocking motion referred to applies tension to the cable with a jerk that may break or stretch the cable. Stretching of the cables with resulting slack increases the jerking pulls on the cable, especially during starting and stopping. Such a jerking motion is both an inefficient transfer of torque and either snaps the cable immediately or at least shortens the useful life of the cable. It is therefore still another object of the present invention to provide a new and improved flexible coupling of the cable type which will maintain the cable taut at all times and automatically take up any slack that develops as a result of the cable stretching.

Figure 2:
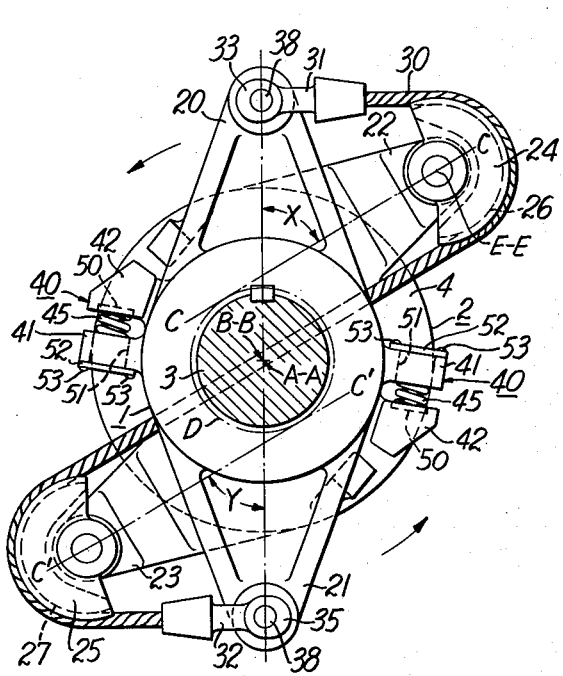
Figure 1:
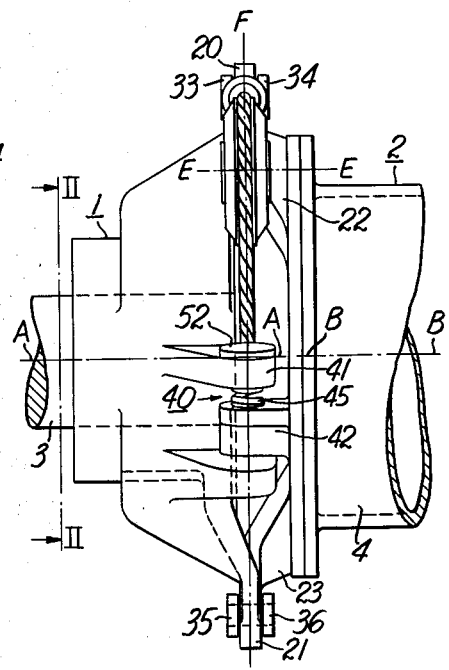

The manner in which the novel features of the present invention operate to achieve the heretofore stated objects will appear from the following description of the invention with reference to the accompanying drawings, in which:

FIG. 1 is a side elevation of a flexible shaft coupling according to the present invention; and FIG. 2 is a transverse vertical section through the coupling disclosed in FIG. 1, the section being taken along line II—II of FIG. 1 looking in the direction indicated by the arrows.

Referring to the drawings, a flexible coupling is shown comprising a rotating driving member 1 and a rotatable driven member 2. The driving member 1 is here shown as being mounted on the end of a shaft 3. The driven member 2 may be connected in any suitable manner to any type of structure desired to be rotated. As here shown, the driven member 2 is connected to a cylindrical shaft structure 4 which is to be turned by shaft 3. The shaft 3 may be the shaft of a driving motor (not shown) or may be connected to other driven shafts in any conventional manner. The shaft 3 is intended merely to represent a shaft driven to turn about a central axis A—A while the cylindrical shaft 4 is to be turned about a central axis B—B.

As may be seen most clearly in FIG. 2, the driving member 1 is provided with a pair of arms 20, 21 that project radially outward from driving member 1 in opposite directions. The driven member 2 is provided with a pair of arms 22, 23. The arms 22, 23 are parallel to each other and extend in opposite directions outwardly from the driven member 2. Each of the arms 22, 23 project outwardly along a line of direction C—C and C'—C', respectively, that is tangent (for reasons that will appear) to a circle D about the axis of rotation B—B of the member 2. A sheave 24 is rotatably mounted on the end portion of the driven arm 22 and a sheave 25 is similarly mounted on the end of arm 23. The sheaves 24, 25 are each mounted to rotate about an axis E—E (FIG. 1) which is parallel to the axis B—B of the driven member 2. The sheaves are provided with grooves 26, 27 (FIG. 2) for a purpose that will appear. End portions of the driving arms 20, 21 and the grooves 26, 27 lie in the common radial plane F—F (see FIG. 1) when the axis of rotation B—B of the driven member 2 is coincident with the axis of rotation A—A of the driving member 1. Within this common plane F—F as may be seen in FIG. 2, each driven arm 22, 23 defines an acute included angle X, Y with a driving arm 20, 21, respectively.

The torque transmitting connection between the driving member 1 and driven member 2 is provided by a cable 30 having terminal portions 31 and 32. Each of the terminals 31 and 32 is a bifurcate member having branches 33, 34 and 35, 36, respectively. Branches 33, 34 are fitted about the end portion of the driving arm 20 and branches 35, 36 are fitted about the end portion of driving arm 21. The terminal portions 31, 32 may be secured to the end portions of the arms 20, 21 by screws 38. To string the cable 30 in the manner that provides for transmitting torque between the driving member 1 and the driven member 2 a terminal, for example 31, may first be connected as shown to the end of the arm 20. The cable 30 is then drawn toward the close adjacent sheave 24 to span the included angle X. The cable 30 is placed in the groove 26 of sheave 24 and then is passed through the center of the coupling to the remote sheave 25. The cable 30 is passed over the remote sheave 25 and placed in the groove 27 in the direction leading toward the second driving arm 21. Thus from the sheave 25 to the arm 21 cable 30 spans the included acute angle Y. It will now be apparent that the tangential alignment of arms 22, 23 permits cable 30 to pass centrally through the space between members 1 and 2 without rubbing on the arms 22, 23. The arrangement further results in the pull on this central portion of cable 30 being parallel to the lines of projection C—C and C'—C'.

Except for the operation of structure to be described later, the parts of the coupling so far described would likely be in a position in which there would be some slack in the cable 30. Upon applying torque to shaft 3, the driving member 1 would be turned in the direction of the arrows shown in FIG. 2. The driving member 1 and its arms 20, 21 would turn counterclockwise as shown in FIG. 2, relative to the driven member 2 and its arms 22, 23. Thus the angles X and Y included therebetween would be increased in magnitude and the length of cable 30 spanning those angles would likewise be increased. Since the length of cable 30 from pulley 24 to pulley 25 is substantially constant, increasing the length of cable required to span angles X and Y will take up any slack in the cable 30. When the cable 30 has been drawn taut by such action, torque will be transmitted from the driving member 1 to the driven member 2 through this cable connection. The flexibility of the cable connection between these two members will permit the axes A—A and B—B to become misaligned without interfering with the transmission of torque between the members.

Upon slowing down of the turning of shaft 3 to coast to a halt, the driven member 2 may slow down at a slower or uneven rate thus providing a tendency for the arms 22, 23 at least at times to catch up slightly with the arms 20, 21 and reduce the angles X and Y and the distances between spanned thereby providing slack in the cables 30. This may be especially true when the coupling is connected on the driven end to a machine such as a grinding mill which has considerable inertia of a loose load that will cause mill rocking both forward and backward before finally stopping. Thus when this type of coupling is used to drive a machine such as a grinding mill and the shaft 3 is coasting to a stop, a backward rock of the mill results in the mill driving the shaft 3 in a backward direction and then when the mill rocks forward slack will occur in the cable. Then on the next backward rock a hard jerk would be applied to the cable.

To eliminate the slackening of the cables 30 and in particular alternate slackening and jerking that may snap the cable, biasing means 40 are provided. The biasing means 40 engage both the driving member 1 and the driven member 2 to urge relative rotation between the members 1 and 2 in a direction that moves arms 20, 21 away from arms 22, 23 to increase the magnitude of the angles X and Y and the magnitude of the span of cable over these angles to maintain the cable taut. Thus biasing means are provided to prevent slack being caused by relative movement between the arms 20, 21 and 22, 23 or by stretching of the cables 30 as well as preventing the cable being jerked by the change of direction of turning as when a mill is rocking just before stopping, by continually pushing the driving and driven arms relatively apart. The biasing means comprise a first lug 41 projecting from the periphery of the driving member 1 through the common plane F—F toward the driven member 2. A second lug 42 projects from the periphery of the driven member 2 through the common plane F—F toward the driving member 1. The lugs 41, 42 are spaced apart from each other and spacing is maintained by providing coil springs 45 in between the lugs 41, 42 to urge them apart. A convenient approach to mounting the coil springs between the lugs 41, 42 is shown as comprising a well 50 in the lug 42 adapted to receive the spring 45 and a bore 51 through the lug 41. The coil spring may be fitted through the bore 51 in the lug 41 and seated in the well 50. The free end of the spring 45 may be pushed downwardly into the bore 51 and a cover 52 secured to the lug 41 by a plurality of bolts 53. Thus the coil spring 45 will urge the lugs 41, 42 relatively apart which in turn urges arms 20 and 22 relatively apart to increase the magnitude of the included angles X and Y and increase the length of the span of cable over those angles. As the spans of the included angles X and Y and the portions of the cable spanning them are increased, the slack if any in the cable 30 will be taken up and the cables will be maintained taut at all times.

Thus it can be seen that the described construction accomplishes the objects of the invention previously referred to. However, modifications and equivalents such as readily occur to those skilled in the art are intended to be included within the scope of this invention and thus the invention is intended to be limited only by the scope of the claims appended hereto.

Having now particularly described and ascertained the nature of my said invention and the manner in which it is to be performed, I declare that what I claim is:

1. A flexible coupling having a pair of members comprising a rotating driving member and a rotatable driven member, a first member of said pair of members having a pair of opposed and outwardly extending arms, a second member of said pair of members having a pair of opposed and outwardly extending arms, end portions of all four of said arms lying in a common radial plane when the axis of rotation of said second member is coincident with the axis of rotation of said first member, within said common plane each said second member arm defining an acute included angle with a first member arm, a flexible connecting means having a first end attached to the end portion of a first arm of said first member, said connecting means spanning said included acute angle and passing over the end portion of the close adjacent arm of said second pair from which the connecting means pass to the remote arm of said second pair, said means passing over said remote arm of said second pair in a direction leading toward the second arm of said first member with said means being secured to said second arm of said first member, and biasing means engaging both members urging relative rotation between said members in a direction tending to increase the length of span of said means over said included acute angle to maintain said means taut when said driving member is coasting to a stop.

2. A flexible coupling having a pair of members comprising a rotating driving member and a rotatable driven member, a first member of said pair of members having a pair of opposed and outwardly extending arms, a second member of said pair of members having a pair of opposed and outwardly extending arms, end portions of all four of said arms lying in a common radial plane when the axis of rotation of said second member is coincident with the axis of rotation of said first member, within said common plane each said second member arm defining an acute included angle with a first member arm, a cable having a first end attached to the end portion of a first arm of said first member, said cable spanning said included acute angle and passing over the end portion of the close adjacent arm of said second pair from which the cable passes to the remote arm of said second pair, said cable passes over said remote arm of said second pair in a direction leading toward the second arm of said first member with said cable being secured to said second arm of said first member, and biasing means engaging both members urging relative rotation between said members in a direction tending to increase the length of span of said cable over said included acute angle to maintain said cable taut when said driving member is coasting to a stop.

3. A flexible coupling having a pair of members comprising a rotating driving member and a rotatable driven member, a first member of said pair of members having a pair of opposed and outwardly extending arms, a second member of said pair of members having a pair of opposed and outwardly extending arms, a sheave rotatably mounted on the end portion of each of said second member arms for oscillation about an axis parallel to the axis of rotation of said second member, said sheaves and the end portions of said first member arms lying in a common radial plane when the axis of rotation of said second member is coincident with the axis of rotation of said first member, within said common plane each said second member arm defining an acute included angle with a first member arm, a cable having a first end attached to the end portion of a first arm of said first member, said cable spanning said included acute angle and passing over the close adjacent sheave from which the cable passes to the remote sheave, said cable passes over said remote sheave in a direction leading toward the second arm of said first member with said cable being secured to said second arm of said first member, and biasing means engaging both said members urging relative rotation between said members in a direction tending to increase the length of span of said cable over said included acute angle to maintain said cable taut when said driving member is coasting to a stop.

4. A flexible coupling having a pair of members comprising a rotating driving member and a rotatable driven member, a first member of said pair of members having a pair of radially opposed and outwardly extending arms, a second member of said pair of members having a pair of parallel opposed and outwardly extending arms each projecting outwardly along a line of direction tangent to a circle about the axis of rotation of said driven member, end portions of all four of said arms lying in a common radial plane when the axis of rotation of said second member is coincident with the axis of rotation of said first member, within said common plane each said second member arm defining an acute included angle with a first member arm, a cable having a first end attached to the end portion of a first arm of said first member, said cable spanning said included acute angle and passing over the end portion of the close adjacent arm of said second pair from which the cable passes to the remote arm of said second pair, said cable passes over said remote arm of said second pair in a direction leading toward the second arm of said first member with said cable being secured to said second arm of said first member, and biasing means engaging both said members urging relative rotation between said members in a direction tending to increase the length of span of said cable over said included acute angle to maintain said cable taut when said driving member is coasting to a stop.

5. A flexible coupling having a pair of members comprising a rotating driving member and a rotatable driven member, a first member of said pair of members having a pair of radially opposed and outwardly extending arms, a second member of said pair of members having a pair of parallel opposed and outwardly extending arms each projecting outwardly along a line of direction tangent to a circle about the axis of rotation of said driven member, a sheave rotatably mounted on the end portion of each of said second member arms for oscillation about an axis parallel to the axis of rotation of said second member, said sheaves and the end portions of said first member arms lying in a common radial plane when the axis of rotation of said second member is coincident with the axis of rotation of said first member, within said common plane each said second member arm defining an acute included angle with a first member arm, a cable having a first end attached to the end portion of a first arm of said first member, said cable spanning said included acute angle and passing over the close adjacent sheave from which the cable passes to the remote sheave, said cable passes over said remote sheave in a direction leading toward the second arm of said first member with said cable being secured to said second arm of said first member, and biasing means engaging both said members urging relative rotation between said members in a direction tending to increase the length of span of said cable over said included acute angle to maintain said cable taut when said driving member is coasting to a stop.

6. A flexible coupling having a pair of members comprising a rotating driving member and a rotatable driven member, a first member of said pair of members having a pair of opposed and outwardly extending arms, a second member of said pair of members having a pair of opposed and outwardly extending arms, end portions of all four of said arms lying in a common radial plane when the axis of rotation of said second member is coincident with the axis of rotation of said first member, within said common plane each said second member arm defining an acute included angle with a first member arm, a flexible connecting means having a first end attached to the end portion of a first arm of said first member said means spanning said included acute angle and passing over the end portion of the close adjacent arm of said second pair from which the means pass to the remote arm of said second pair, said means passing over said remote arm of said second pair in a direction leading toward the second arm of said first member with said means being secured to said second arm of said first member, and biasing means urging relative rotation between said members in a direction tending to increase the length of span of said cable over said included acute angle to maintain said cable taut when said driving member of said pair of members is coasting to a stop, said biasing means comprising a first lug projecting from the periphery of said first member, a second lug projecting from the periphery of said second member, and a spring having end portions thereof each engaging a lug and urging said lugs relatively apart.

7. A flexible coupling having a pair of members comprising a rotating driving member and a rotatable driven member, a first member of said pair of members having a pair of opposed and outwardly extending arms, a second member of said pair of members having a pair of opposed and outwardly extending arms, end portions of all four of said arms lying in a common radial plane when the axis of rotation of said second member is coincident with the axis of rotation of said first member, within said common plane each said second member arm defining an acute included angle with a first member arm, a cable having a first end attached to the end portion of a first arm of said first member, said cable spanning said included acute angle and passing over the end portion of the close adjacent arm of said second pair from which the cable passes to the remote arm of said second pair, said cable passes over said remote arm of said second pair in a direction leading toward the second arm of said first member with said cable being secured to said second arm of said first member, and biasing means urging relative rotation between said members in a direction tending to increase the length of span of said cable over said included acute angle to maintain said cable taut when said driving member of said pair of members is coasting to a stop, said biasing means comprising a first lug projecting from the periphery of said first member, a second lug projecting from the periphery of said second member, and a spring applying a force along an axis lying in said common plane with the end portions of said spring each engaging a lug and urging said lugs relatively apart.

8. A flexible coupling having a pair of members comprising a rotating driving member and a rotatable driven member, a first member of said pair of members having a pair of opposed and outwardly extending arms, a second member of said pair of members having a pair of opposed and outwardly extending arms, a sheave rotatably mounted on the end portion of each of said second member arms for oscillation about an axis parallel to the axis of rotation of said second member, said sheaves and the end portions of said first member arms lying in a common radial plane when the axis of rotation of said second member is coincident with the axis of rotation of said first member, within said common plane each said second member arm defining an acute included angle with a first member arm, a cable having a first end attached to the end portion of a first arm of said first member, said cable spanning said included acute angle and passing over the close adjacent sheave from which the cable passes to the remote sheave, said cable passes over said remote sheave in a direction leading toward the second arm of said first member with said cable being secured to said second arm of said first member, and biasing means urging relative rotation between said members in a direction tending to increase the length of span of said cable over said included acute angle to maintain said cable taut when said driving member of said pair of members is coasting to a stop, said biasing means comprising a first lug projecting from the periphery of said first member through said common plane toward said second member, a second lug projecting from the periphery of said second member through said common plane toward said first member, and a spring applying a force along an axis lying in said common plane with the end portions of said spring each engaging a lug and urging said lugs relatively apart.

9. A flexible coupling having a pair of members comprising a rotating driving member and a rotatable driven member, a first member of said pair of members having a pair of radially opposed and outwardly extending arms, a second member of said pair of members having a pair of parallel opposed and outwardly extending arms each projecting outwardly along a line of direction tangent to a circle about the axis of rotation of said driven member, end portions of all four of said arms lying in a common radial plane when the axis of rotation of said second member is coincident with the axis of rotation of said first member, within said common plane each said second member arm defining an acute included angle with a first member arm, a cable having a first end attached to the end portion of a first arm of said first member, said cable spanning said included acute angle and passing over the end portions of the close adjacent arm of said second pair from which the cable passes to the remote arm of said second pair, said cable passes over said remote arm of said second pair in a direction leading toward the second arm of said first member with said cable being secured to said second arm of said first member, and biasing means urging relative rotation between said members in a direction tending to increase the length of span of said cable over said included acute angle to maintain said cable taut when said driving member of said pair of members is coasting to a stop, said biasing means comprising a first lug projecting from the periphery of said first member, a second lug projecting from the periphery of said second member, and a coil spring having its force axis lying in said common plane with the end portions thereof each engaging a lug and urging said lugs relatively apart.

10. A flexible coupling having a pair of members comprising a rotating driving member and a rotatable driven member, a first member of said pair of members having a pair of radially opposed and outwardly extending arms, a second member of said pair of members having a pair of parallel opposed and outwardly extending arms each projecting outwardly along a line of direction tangent to a circle about the axis of rotation of said driven member, a sheave rotatably mounted on the end portion of each of said second member arms for oscillation about an axis parallel to the axis of rotation of said second member, said sheaves and the end portions of said first member arms lying in a common radial plane when the axis of rotation of said second member is coincident with the axis of rotation of said first member, within said common plane each said second member arm defining an acute included angle with a first member arm, a cable having a first end attached to the end portion of a first arm of said first member, said cable spanning said included acute angle and passing over the close adjacent sheave from which the cable passes to the remote sheave, said cable passes over said remote sheave in a direction leading toward the second arm of said first member with said cable being secured to said second arm of said first member, and biasing means uring relative rotation between said members in a direction tending to increase the length of span of said cable over said included acute angle to maintain said cable taut when said driving member of said pair of members is coasting to a stop, said biasing means comprising a first lug projecting from the periphery of said first member through said common plane toward said second member, a second lug projecting from the periphery of said second member through said common plane toward said first member, and a coil spring having its force axis lying in said common plane with the end portions thereof each engaging a lug and urging said lugs relatively apart.

References Cited in the file of this patent

FOREIGN PATENTS 357,501     France _____ Nov. 13, 1905